(12) United States Patent
Kon (10) Patent No.: US 7,554,429 B2
(45) Date of Patent: Jun. 30, 2009

(54) ELECTROMAGNETIC ACTUATOR

(75) Inventor: Hirozumi Kon, Miyagi (JP)

(73) Assignee: Keihin Corporation, Tokyo (JP)

( * ) Notice: Subject to any disclaimer, the term of this patent is extended or adjusted under 35 U.S.C. 154(b) by 303 days.

(21) Appl. No.: 11/523,733

(22) Filed: Sep. 20, 2006

(65) Prior Publication Data
US 2007/0063795 A1 Mar. 22, 2007

(30) Foreign Application Priority Data
Sep. 20, 2005 (JP) ............... 2005-272509

(51) Int. Cl.
*H02K 41/00* (2006.01)
*H01F 7/00* (2006.01)
*F16F 15/00* (2006.01)
(52) U.S. Cl. ................... 335/278; 310/14; 310/30; 267/140.14
(58) Field of Classification Search ................. 335/278; 267/140.14–140.15; 310/14, 30
See application file for complete search history.

(56) References Cited
U.S. PATENT DOCUMENTS
2004/0233025 A1* 11/2004 Kon et al. ............ 335/220

FOREIGN PATENT DOCUMENTS

| JP | 61-177256 | 11/1986 |
|---|---|---|
| JP | 63-62693 | 4/1988 |
| JP | 2000-193090 | 7/2000 |
| JP | 2002-036978 | 2/2002 |
| JP | 2003-156002 | 5/2003 |
| JP | 2004-291737 A | 10/2004 |

* cited by examiner

*Primary Examiner*—Ramon M Barrera
(74) *Attorney, Agent, or Firm*—Arent Fox LLP (57) ABSTRACT

A sealing member which seals a sealed space where a movable core of an electromagnetic actuator is arranged, includes: an inner ring portion and an outer ring portion which are respectively arranged inside and outside in the radial direction, come into contact with the upper surface of a flange of a fixed core and the lower surface of a coil assembly, and are compressed therebetween; and a thin connection portion integrally connecting the inner and outer ring portions. Therefore, the inner and outer ring portions are compressed and escape toward the upper and lower surfaces of the thin connection portion, whereby the axial thickness of the sealing member can be reduced in an assembled state while securing the sealability of the sealing member. As a result, even if the number of windings of the conducting wire is equal to the conventional device, the diameter of the coil and the entire length of the conducting wire are reduced, whereby the resistance and the inductance of the coil are reduced to improve magnetic response.

3 Claims, 6 Drawing Sheets

ELECTROMAGNETIC ACTUATOR

RELATED APPLICATION DATA

The present invention is based upon Japanese priority application No. 2005-272509, which is hereby incorporated in its entirety herein by reference.

BACKGROUND OF THE INVENTION

1. Field of the Invention

The present invention relates to an electromagnetic actuator comprising: a coil assembly having a coil of a cylindrically wound conducting wire; a movable core axially movably arranged in a sealed space defined within the coil assembly; a fixed core opposed to axial one end face of the movable core; and a sealing member sandwiched between a flange extending radially outward of the fixed core and axial one end face of the coil assembly to seal the sealed space.

2. Description of the Related Art

Japanese Patent Application Laid-open No. 2004-291737 discloses an electromagnetic actuator including a sealing member (elastic plate 47) which is a flat plate-shaped member formed of rubber and the like. In order to increase the sealability, sealing ridges 46 and 46 concentrically projecting from the lower surfaces of a bobbin 38 and a coil cover 41 are caused to pressingly contact the upper surface of the elastic plate 47 such that they bite thereinto, thereby preventing water and dusts from entering a space for accommodating a movable core 53.

However, in this conventional electromagnetic actuator, because the sealing ridges 46 and 46 projecting from the lower surfaces of the bobbin 38 and the coil cover 41 are caused to pressingly contact the upper surface of the elastic plate 47 such that they bite thereinto, if a biting margin is sufficiently secured to enhance the sealability, the elastic plate 47 becomes thick and the axial dimension of the electromagnetic actuator disadvantageously increases.

SUMMARY OF THE INVENTION

The present invention has been achieved in view of the above-mentioned circumstance, and has an object to reduce the axial dimension of an electromagnetic actuator while securing the sealability of a sealing member for sealing a sealed space for accommodating a movable core.

In order to achieve the object, according to a first feature of the present invention, there is provided an electromagnetic actuator comprising: a coil assembly having a coil of a cylindrically wound conducting wire; a movable core axially movably arranged in a sealed space defined within the coil assembly; a fixed core opposed to axial one end face of the movable core; and a sealing member sandwiched between a flange extending radially outward of the fixed core and axial one end face of the coil assembly to seal the sealed space, wherein the sealing member comprises: an inner ring portion and an outer ring portion which are respectively arranged inside and outside in the radial direction, come into contact with the flange of the fixed core and the axial one end face of the coil assembly, and are compressed therebetween; and a thin connection portion integrally connecting the inner and outer ring portions.

With the first feature, the sealing member which seals the sealed space where the movable core of the electromagnetic actuator is arranged, includes: the inner ring portion and the outer ring portion which are respectively arranged inside and outside in the radial direction, come into contact with the flange of the fixed core and the axial one end face of the coil assembly, and are compressed there between; and the thin connection portion integrally connecting the inner and outer ring portions. Therefore, the inner and outer ring portions are compressed and escape toward the upper and lower surfaces of the thin connection portion, whereby the axial thickness of the sealing member can be reduced in an assembled state while securing the sealability of the sealing member. Because the axial length of the coil can be reduced corresponding to the reduction in the thickness of sealing member, if the number of windings of the conducting wire is equal to the conventional device, the diameter of the coil and the entire length of the conducting wire are reduced. As a result, the resistance and the inductance of the coil are reduced to improve magnetic response. Moreover, the materials of the conducting wire and the sealing member can be saved, contributing to reduction of the cost.

According to a second feature of the present invention, in addition to the first feature, a thin engaging portion engageable with an outer peripheral surface of the fixed core is provided on an inner peripheral surface of the inner ring portion of the sealing member.

With the second feature, the thin engaging portion provided on the inner peripheral surface of the inner ring portion of the sealing member is engaged with the outer peripheral surface of the fixed core, so that not only the thin engaging portion can position the sealing member in the radial direction, but also clearances can be formed on the upper and lower surfaces of the thin engaging portion so that the inner ring portion of the sealing member can escape when it is elastically deformed.

The above-mentioned object, other objects, characteristics, and advantages of the present invention will become apparent from a preferred embodiment which will be described in detail below by reference to the attached drawings.

BRIEF DESCRIPTION OF THE DRAWINGS

FIGS. 1 to 5 show a first embodiment of the present invention, wherein

DESCRIPTION OF THE PREFERRED EMBODIMENTS

Figure 1:
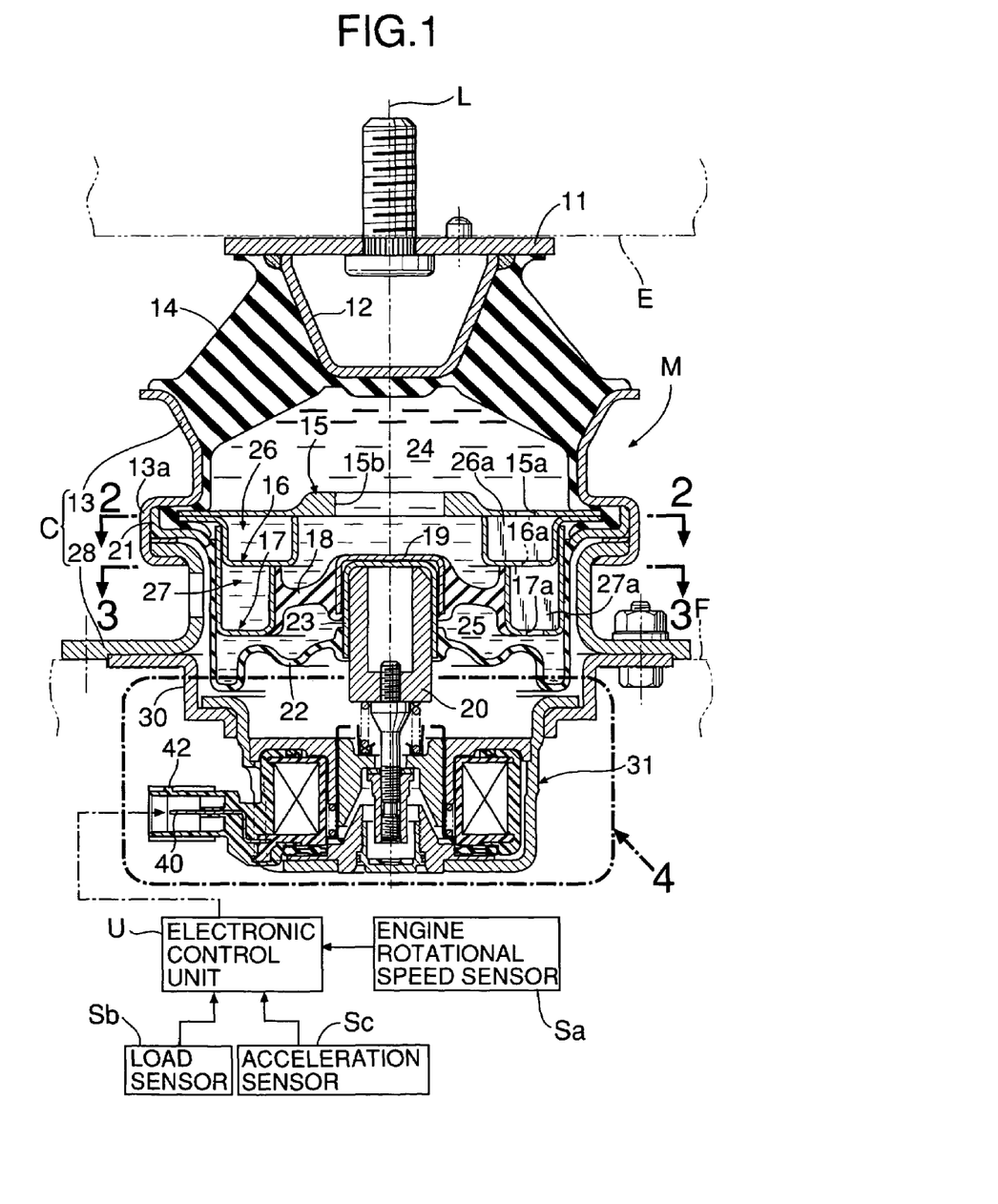
FIG. 1 is a vertical sectional view showing an active type vibration isolating support system having an electromagnetic actuator according to the first embodiment of the present invention.

Referring first to FIG. 1, an active type vibration isolating support system M comprises an electromagnetic actuator 31 of the present invention, and interposed between an engine E and a vehicle body frame F in an automobile, in order to elastically support them.

The active type vibration isolating support system M has actually axisymmetric structure with respect to an axis L, and has a plate-shaped installation bracket 11 to be connected to the engine E; an inner tube 12 welded to this installation bracket 11; an outer tube 13 which is coaxially arranged around an outer periphery of this inner tube 12; and a first elastic body 14 made of thick rubber or the like to be vulcanized and bonded onto conical surfaces of these inner tube 12 and outer tube 13 which oppose to each other. Below this first elastic body 14, there are arranged a first orifice formation member 15, a second orifice formation member 16 and a third or if ice formation member 17, which are arranged vertically and made integral with one another.

The first orifice formation member 15 is shaped like a disk, and has an aperture 15b at a center thereof. The second orifice formation member 16 is annular, having a gutter-shaped cross section, the upper surface of which has been opened, and is integrally joined with the first orifice formation member 15 so that the opened upper surface is closed by the first orifice formation member 15. The third orifice formation member 17 is also annular, having a gutter-shaped cross section, the upper surface of which has been opened, and is integrally joined with the second orifice formation member 16 so that the opened upper surface is closed by the second orifice formation member 16. Outer peripheral portions of the first and second orifice formation members 15, 16 are superimposed on to be made integral with each other, and are fixed to an annular crimping fixed portion 13a continuously provided below the outer tube 13.

On an inner peripheral surface of the third orifice formation member 17, an outer peripheral surface of the annular second elastic body 18 made of rubber or the like is vulcanized and bonded. On the inner peripheral surface of this second elastic body 18, there is vulcanized and bonded a first cap member 19 with the lower surface opened, arranged on the axis L. In this first cap member 19, a second cap member 23 and a movable member 20 are fixed by press-fitting in order. The second cap member 23 has its lower end portion protruding toward a lower place of the first cap member 19. On the outer peripheral surface of this protruded portion, there is vulcanized and bonded an inner peripheral end portion of a diaphragm 22 arranged below the second elastic body 18. On the outer periphery of this diaphragm 22, a ring member 21 is vulcanized and bonded, and this ring member 21 is fixed to the crimping fixed portion 13a together with the outer peripheral portions of the first and second orifice formation members 15, 16. Because of deflection of the second elastic body 18 and the diaphragm 22, the movable member 20 is capable of moving up and down together with the first and second cap members 19, 23.

Thus, between the first elastic body 14 and the second elastic body 18, a first liquid chamber 24, in which liquid is sealed, is defined, and between the second elastic body 18 and the diaphragm 22, a second liquid chamber 25, in which liquid is likewise sealed, is defined. These first and second liquid chambers 24, 25 communicate with each other via an upper orifice 26 and a lower orifice 27 formed by the first to third orifice formation members 15 to 17.

Figure 2:
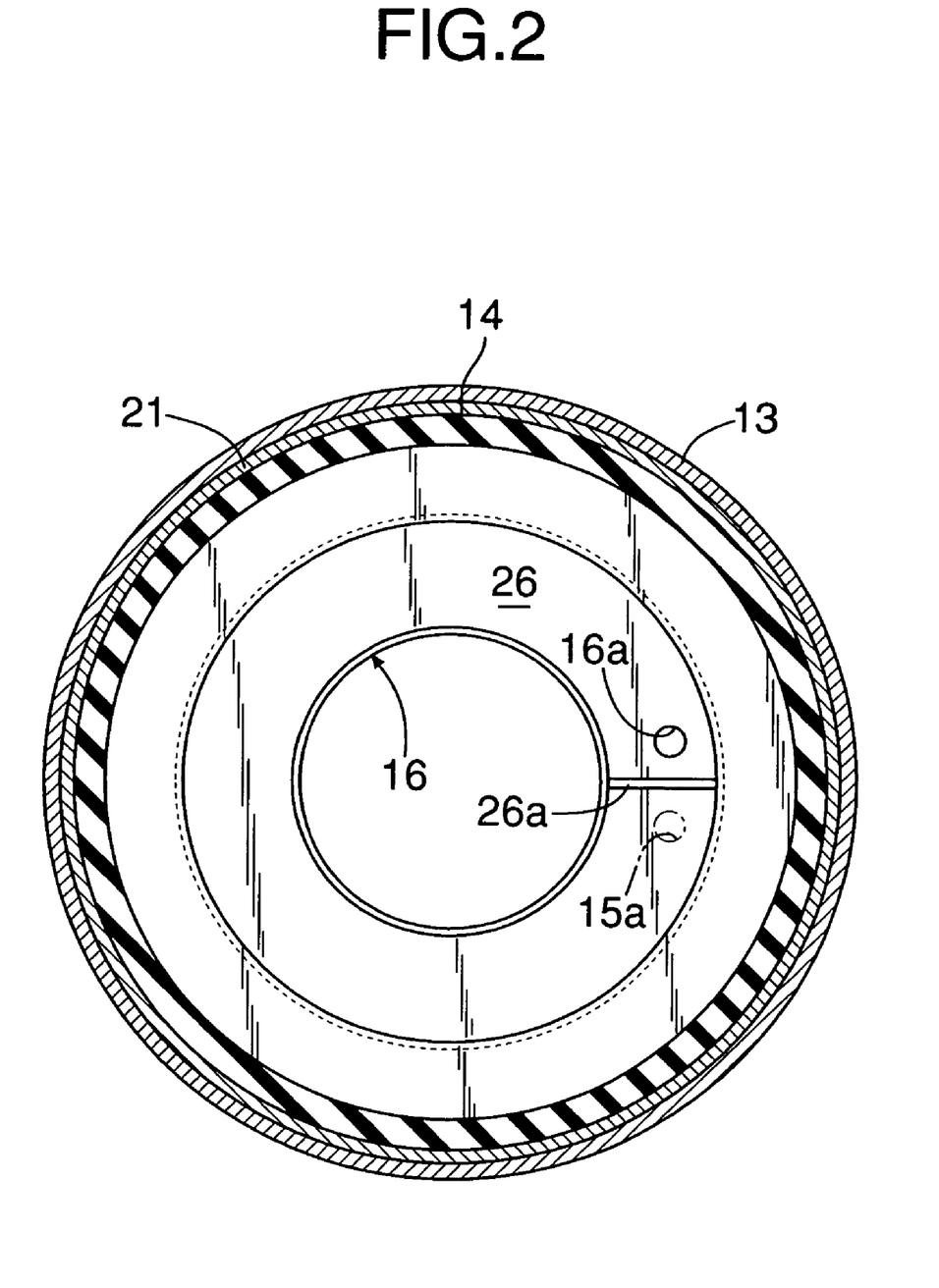
FIG. 2 is a sectional view taken on line 2-2 in FIG. 1.

The upper orifice 26 is defined over a little less than one round thereof between the first and second orifice formation members 15, 16 (See FIG. 2), and a partition wall 26a for constituting opposite end walls of the upper orifice 26 is welded between the first and second orifice formation members 15, 16. The upper orifice 26 communicates with the first liquid chamber 24 via a through-hole 15a in the first orifice formation member 15 on one side of the partition wall 26a, and communicates with the lower orifice 27 via a through-hole 16a in the second orifice formation member 16 on the other side of the partition wall 26a.

Figure 3:
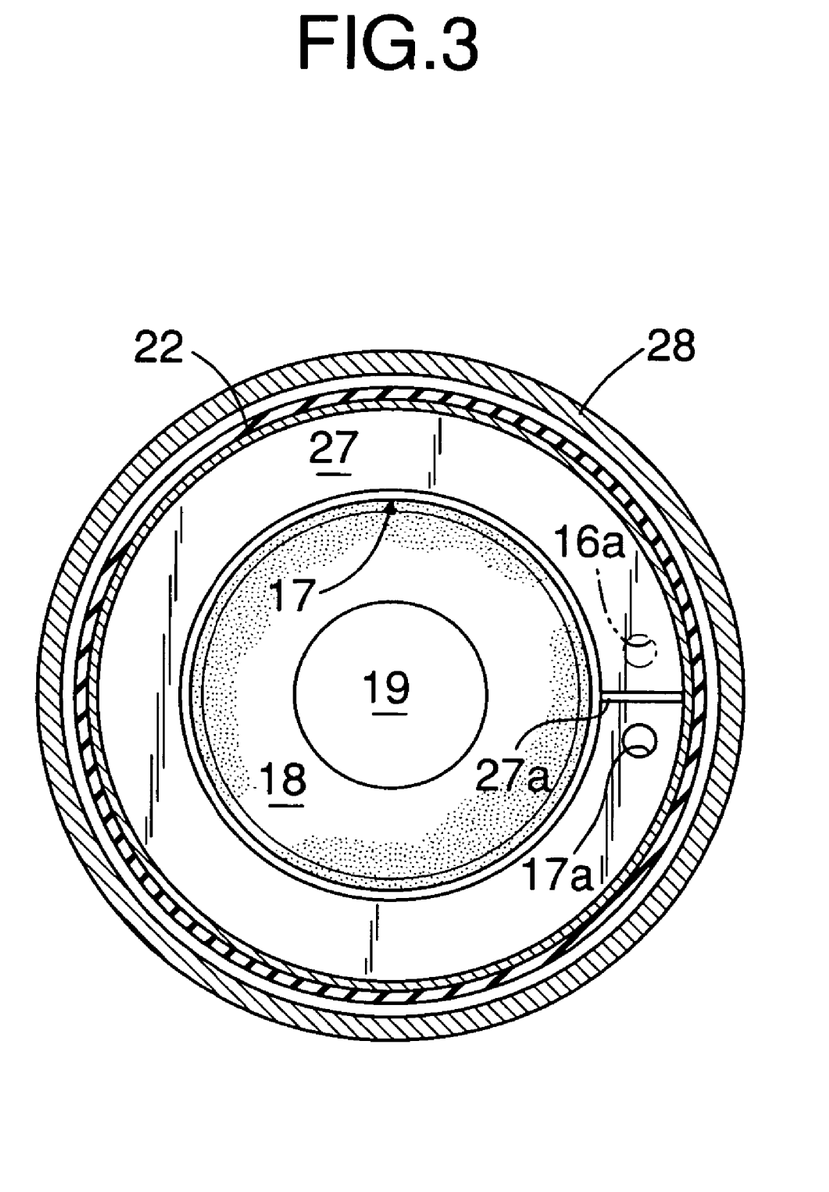
FIG. 3 is a sectional view taken on line 3-3 in FIG. 1.

The lower orifice 27 is defined over a little less than one round thereof between the second and third orifice formation members 16, 17 (See FIG. 3), and a partition wall 27a for constituting both end walls of the lower orifice 27 is welded between the first and second orifice formation members 15, 16. The lower orifice 27 communicates with the upper orifice 26 via the through-hole 16a on one side of the partition wall 27a, and communicates with the second liquid chamber 25 via a through-hole 17a of the third orifice formation member 17 on the other side of the partition wall 27a. Therefore, the first and second liquid chambers 24, 25 are caused to communicate with each other via the upper and lower orifices 26, 27 which have been connected with each other in series.

To the crimping fixed portion 13a, a tube-shaped bracket 28 is also fixed, and this is fixed to the body frame F, whereby the active type vibration isolating support system M is installed to the body frame F. This tube-shaped bracket 28 and the outer tube 13 constitute a supporting casing C of the active type vibration isolating support system M.

To the tube-shaped bracket 28, an actuator supporting member 30 is fixed, and the electromagnetic actuator 31 for driving the movable member 20 is supported by this actuator supporting member 30.

Figure 4:
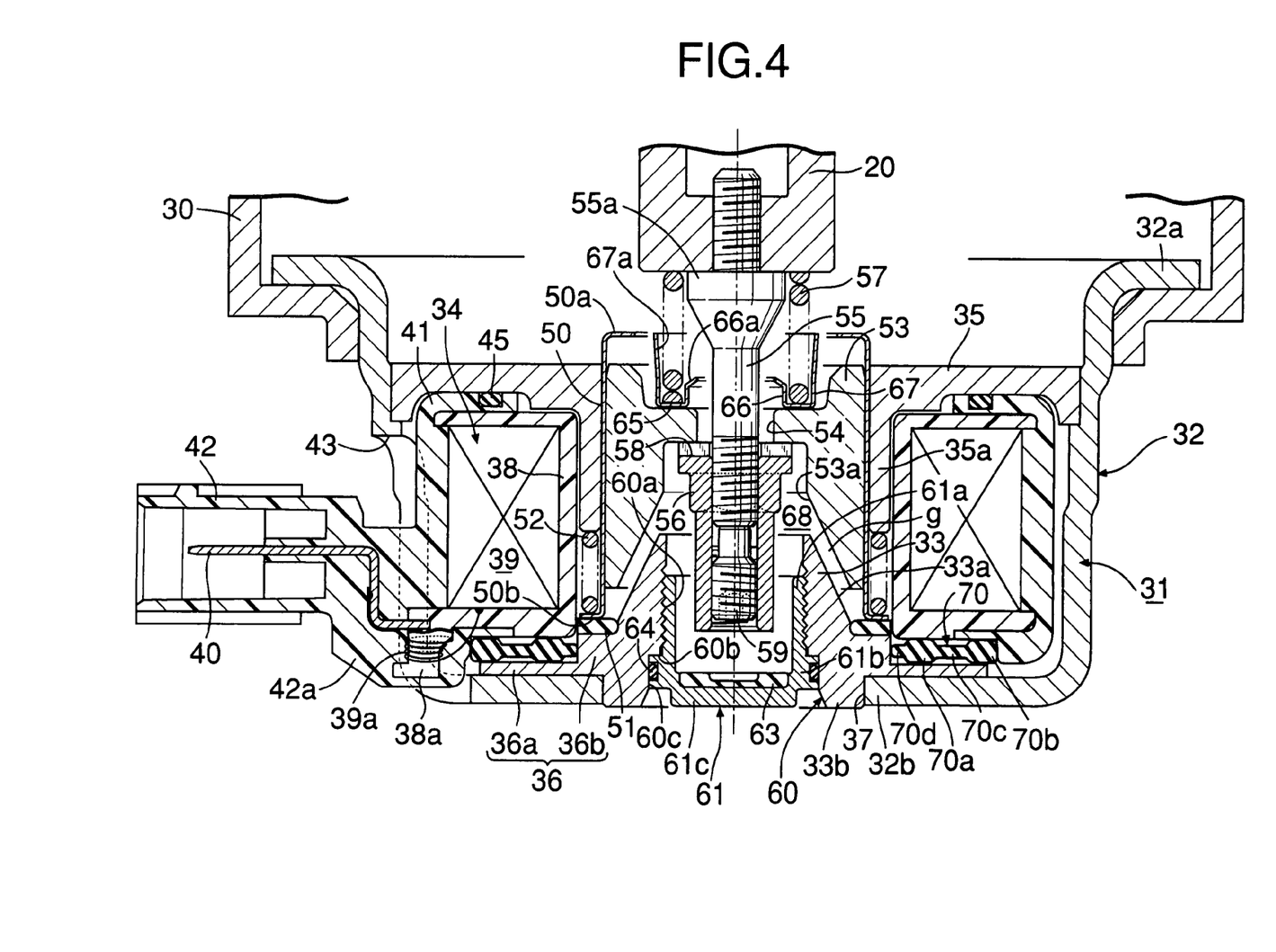
FIG. 4 is an enlarged view showing a part 4 in FIG. 1.

In FIG. 4, the actuator 31 has a closed-end tube-shaped housing 32 made of magnetic material, the upper surface of which has been opened, and a flange 32a formed at the upper end thereof is fixed to the actuator supporting member 30. The housing 32 is magnetic material, within which there are installed a fixed core 33, a coil assembly 34 and a yoke 35 in order. The fixed core 33 has an attracted surface 33a in an upper part thereof, a positioning shaft 33b protruding on an underside thereof, and a stepped collar-shaped flange 36 formed at the outer periphery. The flange 36 is brought into close contact with the bottom wall 32b of the housing 32 so that the positioning shaft 33b is pressed into the positioning hole 37 in the bottom wall 32b. Thus, the fixed core 33 is fixed to the housing 32.

The coil assembly 34 has a bobbin 38 made of synthetic resin to be arranged at the outer periphery of the fixed core 33, and a coil 39 to be wound around this bobbin 38. On the outer periphery of the lower flange of the bobbin 38, a small strut 38a protruding downward is projectingly provided. During molding of this small strut 38a, a proximal end portion of the coupler terminal 40 is insert-connected to the small strut 38a. Around the small strut 38a, an outgoing line 39a of the coil 39 is wound, the tip end of which is connected to the coupler terminal 40 by means of soldering, electric welding or the like.

After the outgoing line 39a is connected to the coupler terminal 40, in order to seal the coil 39 to the bobbin 38, a tube-shaped coil cover 41 which comes into close contact from the upper and lower end surfaces of the bobbin 38 to the outer peripheral surface of the coil 39 is injection-molded using synthetic resin. On that occasion, on this coil cover 41, there are integrally formed a coupler 42 for holding the coupler terminal 40 to protrude outward in the radial direction of the coil cover 41, and a protruded portion 42a for enveloping the outgoing line 39a from the small strut 38a to protrude on the lower end surface of the coil cover 41. This coupler 42 is arranged so as to expose outside the housing 32 through an aperture 43 provided from the bottom wall 32b of the housing 32 to the peripheral wall. The protruded portion 42a is arranged within the aperture 43 so as to be adjacent to the bottom wall 32b of the housing 32.

On the upper end surface of the coil assembly 34, particularly on the upper end surface of the coil cover 41, there is mounted an annular sealing member 45. Also, between the lower end surface of the coil assembly 34 and a thin outer peripheral portion 36a of the flange 36, there is interposed a sealing member 70.

Figure 5:
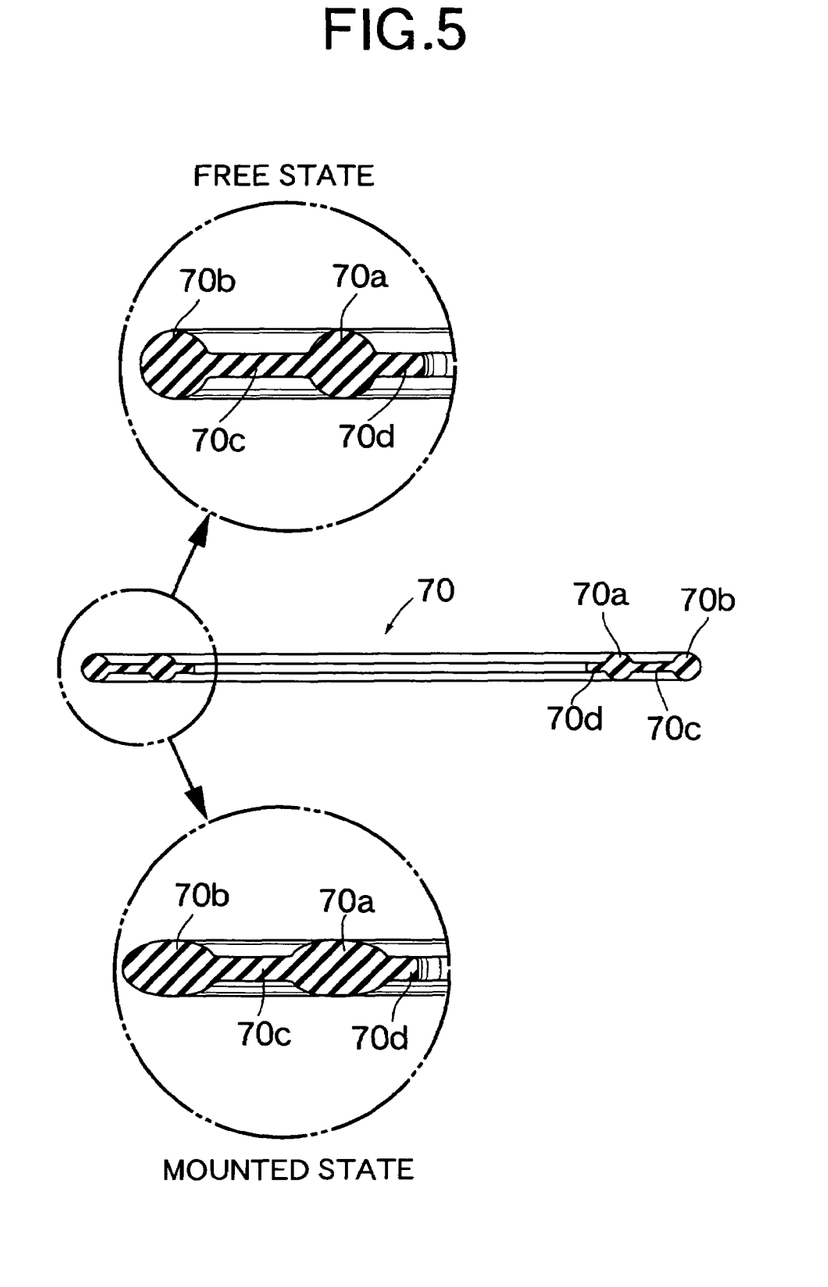
FIG. 5 is a sectional view of a seal member.

As apparent from FIGS. 4 and 5, the sealing member 70 is formed of an elastic material such as NBR and silicon rubber.

The sealing member 70 comprises: an inner ring portion 70a and an outer ring portion 70b, for example, with circular sections, respectively arranged inside and outside of the radial direction, coming into contact with the flange 36 of the stationary core 33 and the lower surface of coil assembly 34, and compressed there between; a plate-shaped thin connection portion 70c integrally connecting the inner ring portion 70a and the outer ring portion 70b; and a plate-shaped thin engaging portion 70d extending radially inward from the inner peripheral surface of the inner ring portion 70a.

The yoke 35 is fixed to the inner peripheral surface of the housing 32 by press-fitting in order to press and hold the coil assembly 34 toward the flange 36. With this fixing, the sealing members 45 and 70 are compressed, whereby the coil assembly 34 is elastically supported without looseness between the yoke 35 and the flange 36. With this arrangement, the space accommodating the coil 39 and the movable core 53 serves as a sealed space 68, thereby improving the water proof property.

On the inner peripheral surface of a cylindrical portion 35a to be arranged on the inner periphery of the bobbin 38 of the yoke 35, a thin tube-shaped bearing member 50 is slidably fitted. At the upper end of this bearing member 50, an inwardly-facing flange 50a pointing inwardly in the radial direction is integrally formed, while at the lower end thereof, an outwardly-facing flange 50b pointing outwardly in the radial direction is integrally formed. The outwardly-facing flange 50b is superimposed on the thick inner peripheral portion 36b of the flange 36 through the annular elastic plate 51, and between this outwardly-facing flange 50b and the fixed core 33, a set spring 52 made of coil spring is provided in a compressed state, whereby the bearing member 50 is elastically held on the flange 36 for vibration isolation.

Also, when the movable core 53 descends on the fixed core 33 side, the elastic plate 51 also serves as a descending stopper for the movable core 53, which receives the lower end of the movable core 53 as a cushion in order to avoid collision between both cores 33, 53 and defines a descending limit thereof.

Slidably fitted to the bearing member 50 is the movable core 53 having an attracted surface 53a opposed to an attracted surface 33a of the fixed core 33 through the air gap g. The upper end of a connecting bolt 55 which loosely penetrates a comparatively large-diameter through-hole 54 opened at the central part of this movable core 53 is threadably attached to the movable member 20. At the lower end portion of the connecting bolt 55, an adjustment nut 56 of the movable core 53 for supporting the lower end surface around the through-hole 54 is threadably engaged. On that occasion, the set spring 57 for holding the movable core 53 at a supporting position by the adjustment nut 56 is provided between the movable member 20 and the movable core 53 in a compressed state. Thus, the movable core 53 is elastically interposed between the set spring 57 and an adjustment nut 56 threadably engaged with the connecting bolt 55 made integral with the movable member 20. On the upper end surface of the adjustment nut 56 held in press contact with the movable core 53, a radial ventilating groove 58 communicating with the through-hole 54 is formed in such a manner that when the movable core is moving up and down, air can be smoothly circulated in space above and below it.

Thus, if a threaded position of the adjustment nut 56 with the connecting bolt 55 is advanced and retreated, up and down positions of the movable core 53, that is, the air gap g between attracted surfaces 33a and 53a of the movable core 53 and the fixed core 33 can be adjusted by corporation with the set spring 57. An adjustment position of the adjustment nut 56 is threadably engaged with and tightly fastened from below by the adjustment nut 56, and is fixed by a lock screw 59.

At the central portion of the fixed core 33, an adjustment operating hole 60 for allowing the adjustment nut 56 to go in and out is provided, and by means of a tool inserted into this adjustment operating hole 60, the lock screw 59 and the adjustment nut 56 are adapted able to be operated. The adjustment operating hole 60 is composed of a threaded hole 60a and a fitting hole 60c having a diameter larger than that of the threaded hole 60a, continuing to the lower end of the threaded hole 60a through an annular shoulder portion 60b. On the other hand, a peg body 61 closing the adjustment operating hole 60 is shaped like a bottomed tube with its upper end opened, and has a threaded tube 61a to be threadably engaged with the threaded hole 60a while receiving the adjustment nut 56, a collar portion 61b to be fitted in a fitting hole 60c, and a bottom portion 61c. On the outer periphery of the collar portion 61b, there is mounted a sealing member 64 which comes into close contact with the inner peripheral surface of the fitting hole 60c. At the underside of the bottom portion 61c, there is formed a polygonal tool engaging projection 62.

Until the collar portion 61b fitted in the fitting hole 60c abuts against the shoulder portion 60b, the threaded tube 61a is threadably engaged with and tightly fastened to the threaded hole 60a, whereby the adjustment operating hole 60 can be closed watertightly by the peg body 61.

On the upper surface of the bottom portion 61c of this peg body 61, the elastic plate 63 is bonded, and the bottom portion 61c receives the lower end of the adjustment nut 56 through this elastic plate 63 as a cushion to define a descending limit of the movable member 20. However, when the adjustment nut 56 abuts against the bottom portion 61c of the peg body 61, the movable member 20 further descends while the movable member 20 compresses the set spring 57 after the movable core 53 reaches the above-described descending limit by descending of the movable member 20.

Within the bearing member 50, each of attracted surfaces 33a, 53a of the fixed core 33 and the movable core 53 which oppose to each other is formed in a conical surface so as to define a conical tube-shaped air gap g therebetween, and is arranged so that the attracted surface 53a of the movable core 53 surrounds the attracted surface 33a of the fixed core 33. Therefore, even in the fixed core 33 and the movable core 53 within the bearing member 50, each having a comparatively small diameter within the bearing member 50, it is possible to acquire a comparatively strong attraction force and a comparatively long stroke of the movable core 53.

Moreover, since the attracted surface 53a of the movable core 53 is to be formed on the inner peripheral surface side of the core 53, a supporting span of the movable core 53 by the bearing member 50 can be secured sufficiently long irrespective of the attracted surface 53a, and stable ascent and descent of the movable core 53 can be ensured. In this case, it is effective in acquiring further stable, smooth ascent and descent of the movable core 53 that the outer peripheral surface of the movable core 53 is formed with a low friction material layer made of Teflon (registered trademark) or the like.

The set spring 57 is made of coil spring, and by fitting it to a large-diameter portion 55a at the base of the connecting bolt 55, the set spring 57 is arranged concentrically with the connecting bolt 55. Also, between this set spring 57 and the movable core 53, there is interposed an annular spring seat 65 made of steel plate in order to prevent the movable core 53 from wearing. This spring seat 65 has inner and outer concentric positioning tubular portions 66, 67 which stand up along the inner peripheral surface and outer peripheral surface of the set spring 57 from the inner peripheral edge portion and outer peripheral edge portion, and the outside positioning tubular portion 67 is formed longer than the inside positioning tubular portion 66. In order to facilitate insertion of the set spring 57 between these positioning tubular portions 66, 67, there are formed funnel portions 66a, 67a at the upper end portions of the positioning tubular portions 66, 67. Also, on at least one of abutted surfaces in which this spring seat 65 and the movable core 53 oppose to each other, a low friction material layer of Teflon (registered trademark) or the like is formed to thereby make sliding property of the spring seat 65 to the movable core 53 excellent.

Referring to FIG. 1, to a coil 39 of the actuator 31, an electronic control unit U is connected through a coupler 42, and to this electronic control unit U, there is inputted each detection signal of a rotation speed sensor Sa for detecting engine rotation speed, a load sensor Sb for detecting a load to be inputted into an active type vibration isolating support system M, and an acceleration sensor Sc for detecting acceleration that is exerted on an engine E.

Next, the description will be made of an operation of this embodiment.

When the actuator 31 of the active type vibration isolating support system M is in a non-operating state, although the first and second liquid chambers 24, 25 which communicate with each other through the upper and lower orifices 26, 27 are kept at the same pressure, since a pressure receiving area in the fist liquid chamber 24 of the first cap member 19 connected to the movable member 20 is larger than a pressure receiving area in the second liquid chamber 25, a downward load obtained by multiplying the difference in area by pressure in the first liquid chamber 24 is exerted on the movable member 20. When a balance is established between the load and a repulsion force of the second elastic body 18 against it, the movable member 20 comes to a halt, forming a predetermined initial air gap g between adsorption surfaces 33a, 53a of the fixed core 33 and the movable core 53.

When shake vibration of low frequency occurs in the engine E during running of an automobile, the first elastic body 14 is deformed because of a load inputted from the engine E to change capacity of the first liquid chamber 24. Then, the liquid goes and comes between the first and second liquid chambers 24, 25 which communicate with each other through the upper and lower orifices 26, 27. When the capacity of the first liquid chamber 24 is enlarged and reduced, the capacity of the second liquid chamber 25 is reduced and enlarged accordingly, and the variations in capacity of this second liquid chamber 25 are absorbed by elastic deformation of a diaphragm 22. At this time, since shapes and dimensions of the upper and lower orifices 26, 27 and spring constant of the first elastic body 14 have been set so as to show high spring constant and a high attenuation force in a frequency domain of the shake vibration, vibration to be transmitted from the engine E to the body frame F can be effectively reduced.

In such a shake vibration domain of low frequency of the engine E, the actuator 31 is kept in a non-operating state.

When vibration of a frequency higher than the shake vibration, that is, idle vibration or booming noise vibration that occurs during idling of the engine E occurs, liquid within the upper and lower orifices 26, 27 which connect the first and second liquid chambers 24, 25 enters a stick state, so that the engine E becomes unable to exhibit a vibration isolating function. In such a case, the actuator 31 is driven to exhibit the vibration isolating function.

In other words, the electronic control unit U controls energizing to a coil 39 of the actuator 31 on the basis of a detection signal inputted from the engine rotation speed sensor Sa, the load sensor Sb, the acceleration sensor Sc and the like. Specifically, when the engine E leans is displaced downward because of vibration and the capacity of the first liquid chamber 24 is reduced due to the downward deformation of the first elastic body 14 to raise the liquid pressure, the coil 39 is energized to attract the movable core 53 on the fixed core 33 side. As a result, the movable core 53 descends while deforming the second elastic body 18 so that the capacity of the first liquid chamber 24 is enlarged, whereby it is possible to restrict the rise in pressure in the chamber 24, and after all, the active type vibration isolating support system M generates an active supporting force for preventing the downward load from the engine E to the body frame F from being transmitted.

On the other hand, when the engine E is displaced upward and the capacity of the first liquid chamber 24 is enlarged to raise the pressure in the chamber 24, the coil 39 is demagnetized to release the movable core 53. As a result, the movable core 53 rises due to the repulsion force of the second elastic body 18 so that the capacity of the first liquid chamber 24 is reduced, whereby it is possible to restrict the drop in pressure in the chamber 24, and after all, the active type vibration isolating support system M generates an active supporting force for preventing the upward load from the engine E to the body frame F from being transmitted.

During such an operation, when with an excessive increase in the downward load from the engine E to the first elastic body 14, the pressure in the fist liquid chamber 24 is abruptly increased to apply the excessive downward load to the movable member 20, the movable member 20 first descends the movable core 53 to its descent limit, that is, until the lower end surface of the core 53 is abutted against the elastic plate 51 on the thick inner peripheral portion 36b of the flange 36. Thereafter, the set spring 57 is compressed and becomes deformed so that the adjustment nut 56 is moved away from the underside of the movable core 53, whereby the movable member 20 is allowed to further move toward the fixed core 33 side. Accordingly, by causing the set spring 57 to absorb the excessive load of the movable member 20, it is possible to prevent mutual contact between the fixed core 33 and the movable core 53, and the excessive load acting on the movable core 53 and the elastic plate 51, and to secure their durability.

Thus, if after the movable core 53 reaches the descent limit, the movable member 20 descends by a predetermined amount, the adjustment nut 56 will abut against a bottom portion 61c of the peg body 61 fixed to the fixed core 33 through the elastic plate 63 to restrict any excessive increase in the load on the set spring 57, thereby preventing any increase in over-load on the fixed core 33 and the movable core 53.

The circular inner peripheral surface of the thin engaging portion 70d of the sealing member 70 is engaged with the thick inner peripheral potion 36b of the flange 36, so that the sealing member 70 is positioned in the radial direction. In this state, the inner ring portion 70a having a circular section and sandwiched between the flange 36 of the fixed core 33 and the bobbin 38 is compressed into a vertically flat shape to exert a sealing function. The outer ring portion 70b having a circular section and sandwiched between the flange 36 of the fixed core 33 and the coil cover 41 is compressed into a vertically flat shape to exert a sealing function. At this time, the compressed inner ring portion 70a can be freely deformed using the upper and lower surfaces of the thin connection portion 70c and the thin engaging portion 70d as clearances, and the compressed outer ring portion 70b can be freely deformed using the thin connection portion 70c and a space outward of the thin connection portion 70c as clearance. Thus, the thickness of the sealing member 70 in the direction of an axis L can be reduced in an assembled state.

According to the first embodiment, the thickness of the sealing member 70 can be reduced, for example, by the diameter of a conducting wire (i.e., one layer of the conducting wire) as compared to the conventional device (see Japanese Patent Application Laid-open No. 2004-291737). When the thickness of the sealing member 70 is reduced in this manner, the length of the coil 39 in the direction of the axis L can be increased without increasing the length of the actuator 31 in the direction of the axis L. As a result, even if the number of windings of the conducting wire is equal to the conventional device, the diameter of the coil 39 and the entire length of the conducting wire are reduced, whereby the resistance and the inductance of the coil 39 can be reduced to improve magnetic response. Moreover, the materials of the conducting wire and the sealing member 70 can be saved, thereby contributing to reduction of the cost.

Figure 6:
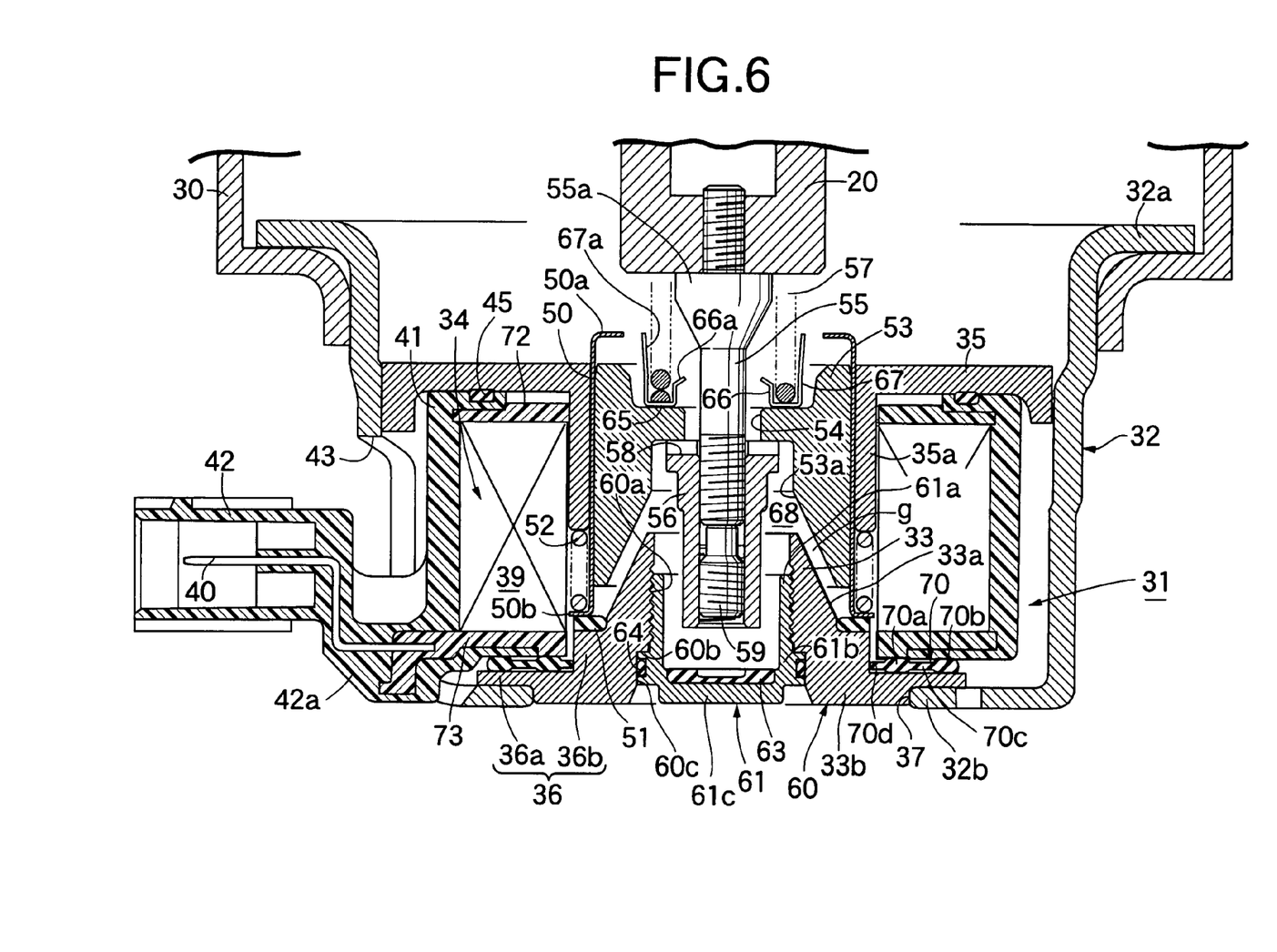
FIG. 6 is a vertical sectional view of an electromagnetic actuator according to a second embodiment of the present invention.

Next, the second embodiment of the present invention will be described with reference to FIG. 6. In this second embodiment, components corresponding to those in the first embodiment are denoted by the same reference numerals and symbols in the first embodiment, and the overlapping description thereof is omitted.

The coil 39 of the first embodiment comprises the bobbin 38, but the coil 39 of the second embodiment is a bobbinless coil comprising no bobbin. The structure of the second embodiment is substantially the same as that of the first embodiment, except that the coil 39 of the second embodiment has no bobbin. The upper and lower surfaces of the coil 39 wound in a cylindrical shape are covered with an upper plate 72 and a lower plate 73, respectively. The coil cover 41 is molded to cover the upper surface of the outer periphery of the upper plate 72 and the lower surface of the outer periphery of the lower plate 73.

The structure of the sealing member 70 is the same as that of the first embodiment. The circular inner peripheral surface of the thin engaging portion 70d of the sealing member 70 is engaged with the thick inner peripheral portion 36b of the flange 36, so that the sealing member 70 is positioned in the radial direction. The inner ring portion 70a of the sealing member 70 is sandwiched between the flange 36 of the fixed core 33 and the lower plate 73 to exert a sealing function. The outer ring portion 70b is sandwiched between the flange 36 of the fixed core 33 and the coil cover 41 to exert a sealing function. At this time, the compressed inner ring portion 70a can be freely deformed using the upper and lower surfaces of the thin connection portion 70c and the thin engaging portion 70d as clearances, and the compressed outer ring portion 70b can be freely deformed using the thin connection portion 70c and a space radially outward of the thin connection portion 70c as clearances. Thus, the thickness of the sealing member 70 in the direction of the axis L can be reduced in an assembled state.

As compared to the effects of the first embodiment, the second embodiment using the bobbinless coil 39 additionally provides the following effects: the number of components and cost can be reduced with the elimination of the bobbin; and the inner diameter of the coil 39 can be reduced correspondingly to the elimination of the bobbin. Moreover, when the inner diameter of the coil 39 becomes small, the length of the conducting wire for securing a required number of windings can be reduced, thereby reducing the resistance and the inductance of the coil 39 to improve electric current response.

Although the embodiments of the present invention have been explained above, various changes in design can be made to the invention without departing from the subject matter of the present invention.

Although the actuator 31 in the embodiments is applied to the active type vibration isolating support system M, for example, it can be applied to any other usages.

Also, the sectional shapes of the inner ring portion 70a and the outer ring portion 70b of the sealing member 70 in the embodiments are each formed into a circular shape, but may be formed into any shapes such as an oval shape, a diamond shape and a square shape. That is, they can have any shapes as long as they have compressible projections vertically project over the thin connection portion 50c (so as to exert a sealing function).

What is claimed is:

1. An electromagnetic actuator comprising:
a coil assembly having a coil of a cylindrically wound conducting wire;
a movable core arranged movably in an axial direction of the coil assembly in a sealed space defined within the coil assembly;
a fixed core opposed to an axial one end face of the movable core; and
a sealing member sandwiched between an inner side face of a flange extending radially outward of the fixed core and an axial one end face of the coil assembly opposed to the inner side face of the flange to seal the sealed space,
wherein both of the inner side face of the flange and the axial one end face of the coil assembly are formed as flat faces,
wherein the sealing member comprises:
an inner ring portion and an outer ring portion which are arranged at a distance therebetween and respectively inside and outside in the radial direction, the inner and the outer ring portions being clamped between the flange of the fixed core and the axial one end face of the coil assembly in a compressed state, respectively; and
a thin connection portion integrally connecting the inner and the outer ring portions,
wherein the inner and the outer ring portions are each formed to have a cross-sectional shape projecting outside of opposite faces of said thin connection portion in said axial direction in both of a free state and said compressed state of the respective ring portions.

2. The electromagnetic actuator of claim 1, wherein a thin engaging portion engageable with an outer peripheral surface of the fixed core is provided on an inner peripheral surface of the inner ring portion of the sealing member.

3. The electromagnetic actuator of claim 1, wherein the sealing member further comprises an engaging portion extending radially inward from the inner ring portion and contacting a thick inner peripheral portion of the flange, wherein the connection portion and the engaging portion are axially thinner than the inner ring portion and the outer ring portion.

* * * * *